United States Patent
Shinkai et al.

(10) Patent No.: US 6,187,468 B1
(45) Date of Patent: Feb. 13, 2001

(54) ELECTRODES FOR FUEL CELLS

(75) Inventors: Hiroshi Shinkai; Ichirou Tanaka; Minako Onodera; Kazuhiko Iwasaki; Tsugio Ohba; Hideo Kato; Ichirou Baba, all of Wako (JP)

(73) Assignee: Honda Giken Kogyo Kabushiki Kaisha (JP)

( * ) Notice: Under 35 U.S.C. 154(b), the term of this patent shall be extended for 0 days.

(21) Appl. No.: 09/442,617

(22) Filed: Nov. 18, 1999

(30) Foreign Application Priority Data

Nov. 30, 1998 (JP) .................................................. 10-339468

(51) Int. Cl.$^7$ ...................................................... H01M 4/86
(52) U.S. Cl. .............................. 429/42; 429/44; 502/101; 29/623.5
(58) Field of Search ....................... 429/42, 44; 29/623.5; 502/101

(56) References Cited

U.S. PATENT DOCUMENTS

| | | | |
|---|---|---|---|
| 5,242,765 | * | 9/1993 | Naimer et al. .......................... 429/42 |
| 5,474,857 | * | 12/1995 | Uchida et al. .......................... 429/42 |
| 5,702,755 | | 12/1997 | Mussell ................................. 429/42 |
| 5,723,173 | * | 3/1998 | Fukuoka et al. ....................... 429/42 |

FOREIGN PATENT DOCUMENTS

| | | |
|---|---|---|
| 1-266848 | 10/1989 | (JP) . |
| 5-036418 | 2/1993 | (JP) . |
| 5-047389 | 2/1993 | (JP) . |
| 5-089880 | 4/1993 | (JP) . |
| 8-088008 | 4/1996 | (JP) . |
| 8-236122 | 9/1996 | (JP) . |
| 8-236123 | 9/1996 | (JP) . |

\* cited by examiner

Primary Examiner—Bruce F. Bell
(74) Attorney, Agent, or Firm—Lahive & Cockfield, LLP

(57) ABSTRACT

This invention provides an electrode for a fuel cell comprising a catalyst layer obtained by a first step of homogeneously mixing carbon supporting platinum which is an electrode catalyst, an alcohol solution of an ion conductive component which is a solid polymer electrolytic membrane component, and an organic solvent, by means of a stirrer having a grinding effect to produce electrode paste in which the carbon is highly dispersed; a second step of stirring said electrode paste by means of a three-dimensional vibrating stirrer in order to obtain highly structured carbon on which platinum is supported; and a third step of coating a gas diffusion electrode material and/or a solid polymer electrolytic membrane with the electrode paste in which the carbon is highly structured, followed by removal of the organic solvent.

10 Claims, 4 Drawing Sheets

ELECTRODES FOR FUEL CELLS

FIELD OF THE INVENTION

The present invention relates to electrodes for fuel cells, and specifically, to electrodes for solid polymer electrolyte type fuel cells.

BACKGROUND OF THE INVENTION

In fuel cells, particularly in solid polymer electrolyte type fuel cells, ion-exchange membranes are used as solid polymer electrolytes and these electrolytic membranes are arranged both in order to intervene between anodes and cathodes. For example, hydrogen is supplied to the anode side, and oxygen or air is supplied to the cathode side, thereby allowing electrochemical reaction to occur to generate electricity.

As an electrode used in the solid polymer electrolyte type fuel cells, a so-called membrane electrode assembly (MEA) is known. In the MEA, electrodes are made of catalyst particles prepared by allowing carbon to support a noble metal, a solid polymer electrolytic component formed on the catalyst particles, and a fluorine resin adhering the catalyst particles to one another. The electrodes are each arranged on both sides of a solid polymer electrolytic membrane, thereby constituting a fuel cell (Japanese Publication of Unexamined Application, Kokai Publication No. 5-36418).

In some cases, both electrodes of anodes and cathodes in contact with the solid polymer electrolytic membranes contain noble metal catalysts such as platinum for enhancing the reaction. As for methods for producing the electrodes of this type, various methods have hitherto been proposed. Specifically, the electrodes are produced by coating ion-exchange membranes as the solid polymer electrolytic membranes, or gas diffusion electrode materials with mixtures of catalyst particles and solid polymer electrolytic components to form catalyst layers.

However, such connection of the catalyst layers with the solid polymer electrolytic membranes by coating or thermocompression bonding limits the reaction sites to two-dimensional interfaces between the electrolytes and the electrodes, so that the substantial working area is small. As one of approaches for improving this problem, it has been attempted that connections of an electrode material with a solid electrolytic membrane material are increased to make the three-dimensional reaction sites, thereby increasing the working area, by laminating an electron-ion mixed conductor layer comprising a mixture of carbon powder supporting a catalytic metal such as platinum, ion-exchange membrane powder and a polystyrene binder, on the ion-exchange membrane as the solid polymer electrolyte (for example, DenkiKagaku (Electrochemistry), 53 (No. 10), 812–817 (1985)).

In this case, a mixture of the carbon powder supporting a catalytic metal such as platinum, the ion-exchange resin (hereinafter also referred to as an "ion conductive component") and an organic solvent is usually mixed and stirred using a homogenizer or a ball mill to prepare a paste for forming an electrode catalyst layer (hereinafter also referred to as "electrode paste") (Japanese Publication of Unexamined Application, Kokai Publication No. 8-88008). Further, when the above-mentioned paste is adhered to a surface of a conductive, gas diffusion porous material or an ion-exchange membrane to form a catalyst layer, thereby preparing a gas diffusion electrode, it is required that the viscosity of the paste is increased for preventing the blocking of pores of a gas diffusion layer (Japanese Publication of Unexamined Application, Kokai Publication No. 8-236122). Then, when carbon paper is used as the porous material, a method of adding a thickner for adjusting the viscosity of the paste to 2,000 to 20,000 cp has been proposed (Japanese Publication of unexamined Application, Kokai Publication No. 8-236123).

Further, a method has also been proposed in which when carbon powder supporting colloid particles containing a catalytic metal such as platinum is crushed in a ball mill, the colloid particles containing a catalytic metal such as platinum partly adhere to fresh surfaces formed by crushing of the carbon powder to disperse the particles uniformly, and are partly converted to solid solutions or alloys by crushing energy to improve the catalytic activity (Japanese Publication of Unexamined Application, Kokai Publication No. 1-266848). Furthermore, when a catalyst in which particles of a metal such as platinum are supported on carbon is ground in a ball mill, the structure of carbon used as a support is broken to reduce the particle size and to homogenize the mixture of a catalyst and a binder (polytetrafluoroethylene) (Japanese Publication of Unexamined Application, Kokai Publication No. 5-47389). In addition, it has been known that when highly structured acetylene black having single particles linked to one another in chain form is ground by a grinding mill equipped with a cutter to form single particles (having an average particle size of 0.5±0.2 μm and an average specific surface area of 70 m$^2$/g or more), the dispersibility of platinum becomes higher than that of highly structured carbon to increase the catalytic activity, when it is used as a support (Japanese Publication of Unexamined Application, Kokai Publication No. 5-89880).

SUMMARY OF THE INVENTION

The present invention has been made over such a technical background, and an object of the invention is to solve the problem of dispersion liquids (electrode paste) containing carbon supporting platinum (hereinafter also referred to as "platinum-supporting carbon") obtained by the conventional mixing using ball mills or the like and ion conductive components, that is to say, the problem that when carbon paper used as porous materials is coated with the above-mentioned paste, the paste enters into pores of the carbon paper to cause the blocking of pores of gas diffusion layers, resulting in a reduction in the utilization ratio of catalysts. Another object of the present invention is to provide techniques which can uniformly cover catalyst particles with ion conductive components, enhance the conductivity, and improve the performance of electric power generation by highly structuring platinum-supporting carbon.

The present inventors have conducted intensive investigation for solving the above-mentioned problem. As a result, the present inventors have discovered that this problem can be solved by two-step stirring of dispersion liquids composed of platinum-supporting carbon, alcohol solutions of ion conductive components and organic solvents without addition of binders such as polytetrafluoroethylene resins or thickners used in the prior art, thus completing the present invention.

The present invention provides an electrode for a fuel cell comprising a catalyst layer obtained by a first step of homogeneously mixing carbon supporting platinum which is an electrode catalyst, an alcohol solution of an ion conductive component which is a solid polymer electrolytic membrane component, and an organic solvent by means of a stirrer having a grinding effect to produce electrode paste in which the carbon is highly dispersed (hereinafter referred to as "highly dispersed carbon electrode paste"); a second step of stirring the above-mentioned electrode paste by means of a three-dimensional vibrating stirrer in order to obtain highly structured carbon on which platinum is supported; and a third step of coating a gas diffusion electrode material and/or a solid polymer electrolytic membrane with the electrode paste in which the carbon is highly structured, followed by removal of the organic solvent.

In this case, the stirrer having a grinding effect is preferably a planetary ball mill or a homogenizer.

Further, in the above-mentioned third step, it is preferred that the gas diffusion electrode material is coated with the electrode paste in which the carbon is highly structured, followed by removal of the organic solvent.

Still further, the above-mentioned gas diffusion electrode material is preferably carbon paper.

Furthermore, the above-mentioned catalyst layer is preferably laminated on the solid polymer electrolytic membrane to constitute a membrane electrode assembly.

BRIEF DESCRIPTION OF THE DRAWINGS

These and other objects and advantages of this invention will become more apparent and more readily appreciated from the following detailed description of the presently preferred exemplary embodiment of the invention taken in conjunction with accompanying drawings, of which.

DESCRIPTION OF THE PREFERRED EMBODIMENTS

Figure 1:
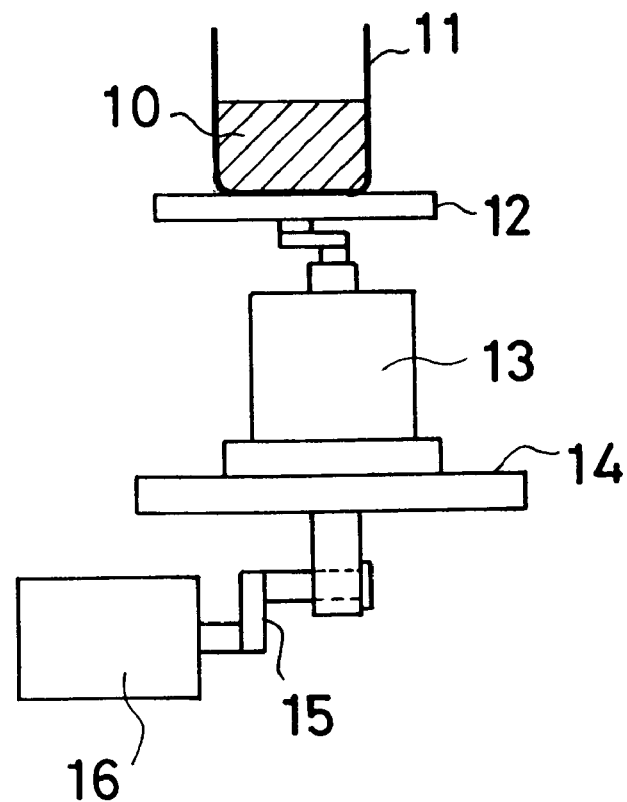
FIG. 1 is a schematic view showing a three-dimensional vibrating stirrer used in a second step of the present invention.

According to the present invention, in a first step, platinum-supporting carbon, an alcohol solution of an ion conductive component and organic solvent are mixed and stirred to produce highly dispersed carbon electrode paste in which aggregated masses of the platinum-supporting carbon are ground, and in a second step, the platinum-supporting carbon in the above-mentioned paste is highly structured by three-dimensional vibrating stirring of the paste and imparted high viscosity. Further, when carbon paper, a gas diffusion electrode material, is coated with the above-mentioned paste, the above-mentioned paste is prevented from entering into pores of the carbon paper by imparting high viscosity to the highly dispersed carbon electrode paste by the above-mentioned method. Thus, it is expected that the utilization ratio of the platinum catalysts is improved.

High structuring of the platinum-supporting carbon is described herein.

The carbon which is a support supporting platinum takes an aggregation structure called a "structure", and the term "highly structured structure" means a state in which structures (aggregates) formed by linking of a number of primary particles are aggregated and associated to form a highly entangled aggregate.

Accordingly, the term "high structuring" means that changing a carbon structure relatively low in aggregation and association and low in the degree of branching into a highly entangled structure. Thus, the viscosity of the paste containing highly structured carbon increases, and a so-called increasing viscosity phenomenon is observed.

In the present invention, it has been discovered that the high structuring of the carbon in the electrode paste which is converted to the low structured structure by crushing, can be achieved by stirring the highly dispersed carbon electrode paste by the use of the three-dimensional vibrating stirrer, as described above. Thus, the present invention has been completed.

Further, there is a correlation between the ability to impart conductivity and the degree of high structuring of carbon, and the conductivity tends to increase as the high structuring proceeds. The reason for this is that when the platinum-supporting carbon is mixed and stirred together with the ion conductive component (for example, "Nafion" (trade name) (5-wt % alcohol solution) manufactured by Aldrich Chemical Co. Inc.), and the ion conductive component enters into pores of the platinum-supporting carbon, reaggregation of carbon particles is prevented, resulting in the embodiment of the high structuring of the carbon.

In the present invention, the platinum-supporting carbon used as the electrode catalyst is obtained by conventional methods as carbon black supporting 10% to 30% by weight of platinum. As for carbon black used as the support, one large in average specific surface area produced by the Ketjen process or the acetylene process is suitably used.

The solid polymer electrolytic membranes used in the present invention are solid polymer electrolytic membranes having sulfone groups as ion-exchange groups for hydrogen ions. Examples thereof include solid polymer electrolytic membranes made of a perfluorocarbonsulfonic acid polymer, for example, "Nafion-115 Membrane" (trade name, manufactured by E. I. du Pont de Nemours and Company), among others. The thickness of the solid polymer electrolytic membranes is usually about 20 to about 120 $\mu$m.

In this case, therefore, the ion conductive components, which are the solid polymer electrolytic membrane components used in the present invention, are perfluorocarbonsulfonic acid polymers, and usually, alcohol solutions of the solid polymer electrolytes are used. Examples thereof include "Nafion" (trade name) (5-wt % alcohol solution) manufactured by Aldrich Chemical Co. Inc.).

For the quantitative ratio of the platinum-supporting carbon and the solid polymer electrolytes (ion conductive components) used in the present invention, it is preferred that the weight ratio of the solid polymer electrolytes to the platinum catalysts (platinum-supporting carbon) is from 0.2 to 2.0. If this ratio is less than 0.2, the ion conductivity significantly decreases. On the other hand, exceeding 2.0 results in a reduction in gas diffusibility inside the electrodes, so that there is a fear of failure to obtain the desired catalytic activity.

The amount of the platinum catalysts is preferably selected so as to give 0.5 to 0.7 mg/cm$^2$ after application of the electrode paste onto the gas diffusion electrode materials and/or the solid polymer electrolytic membranes.

As the above-mentioned organic solvents used in mixing the platinum-supporting carbon with the ion conductive components by stirring, any organic solvents can be used as long as they will disperse the carbon and do not deteriorate the functions of the solid polymer electrolytic membranes. For example, ethylene glycol or a 50/50% mixture (by volume) of ethylene glycol monoisopropyl ether and isopropanol is suitably used. Further, organic solvents unreactive to oxygen such as water, ketones and esters can be added to and mixed with them as long as Theological characteristics such as the kinematic viscosity of the electrode paste for formation of electrode catalyst layers are not impaired.

The amount of the above-mentioned organic solvents used varies depending on the concentration of the alcohol solutions of the ion conductive components (solid polymer electrolytic membranes) used. It is preferred that the amount of the alcohol mixed solvents are selected so as to give 0.1 to 1.4 mg/cm$^2$ of the ion conductive components after application of the electrode paste onto the gas diffusion electrode materials and/or the solid polymer electrolytic membranes. Usually, the concentration of the solid polymer electrolytes is from 2 to 20% by weight.

As for a stirrer used for stirring and mixing in the first step of the present invention, any apparatuses can be used as long as they are stirring and mixing apparatuses having a mechanical grinding effect, not ultrasonic dispersing apparatuses usually employed in the production of a catalyst dispersion liquid in the prior art. From the viewpoint of the grinding effect, examples thereof include homogenizers, ball mills, planetary ball mills and sand mills.

For carrying out stirring and mixing efficiently, the total mixture containing the platinum catalyst supported on the carbon, the ion conductive component solution and the organic solvent is preferably one third the volume of a container of the stirring and mixing apparatus.

The stirring and mixing time is usually within the range of 60 to 300 minutes at ordinary temperature. If the stirring and mixing time is less than 60 minutes, the supporting carbon is insufficiently ground. On the other hand, even if the time exceeds 300 minutes, the more grinding effect of the supporting carbon is not obtained.

Then, three-dimensional vibrating stirrers used in the second step of the present invention, which stir the highly dispersed carbon electrode paste, must exhibit the functions of changing the structure of the carbon ground in the first step to the highly entangled structure, and allowing the ion conductive components to enter the pores of the supporting carbon.

The above-mentioned three-dimensional vibrating stirrer is, for example, an apparatus as shown in FIG. 1, which comprises a base plate 12 having an eccentric shaft against a rotating shaft of a motor 13, the motor 13 for eccentrically rotating the base plate 12, a base plate 14 on which the motor 13 is mounted, a cam 15 moving the base plate 14 up and down and having an eccentric shaft against a rotating shaft of a motor 16, and the motor 16 for rotating the cam 15. A container 11 into which highly dispersed carbon electrode paste 10 is placed is mounted on the above-mentioned base plate 12.

By driving the above-mentioned motor 13 and motor 16 at the same time (the rotational speed can be controlled from 0 to 1,500 rpm), the direction of centrifugal force applied to paste to be stirred is three-dimensionally changed by the vertical reciprocating motion of the cam 15 driven by the motor 16, concurrently with two-dimensional stirring (centrifugal stirring) by rotation of the base plate 12 driven by the motor 13, thereby carrying out three-dimensional vibrating stirring of the paste to be stirred in the container 11 mounted on this apparatus. Such three-dimensional vibrating stirring highly entangles the primary particles of the supporting carbon in the highly dispersed carbon electrode paste 10 to form a carbon structure different from that before grinding in the first step, thereby being able to achieve the high structuring.

The stirring time according to the above-mentioned three-dimensional vibrating stirrers is usually within the range of 30 to 300 minutes at ordinary temperature. If the stirring time is less than 30 minutes, the high structuring of the carbon in the electrode paste is insufficient. On the other hand, if the time exceeds 300 minutes, there is a fear of impairment of Theological characteristics such as the viscoelasticity of the highly structured electrode paste.

Further, in the third step of the present invention, the highly structured electrode paste is applied to the gas diffusion electrode materials and/or the solid polymer electrolytic membranes with doctor blades or the like, and heated and dried (desolvated) to form the catalyst layers. The thickness of the catalyst layers can be changed by adjusting in screen printing or adjusting the clearance of the doctor blades, and the catalyst layers variously different in thickness (containing desired amounts of platinum catalysts supported on the carbon and ion conductive components) can be used as so desired. The thickness of the catalyst layers varies depending on the amounts of platinum catalysts supported on the carbon and ion conductive components. However, it is usually within the range of 50 to 250 $\mu$m in the wet state. If the thickness is less than 50 $\mu$m, there is a fear of an insufficient amount of platinum catalysts. On the other hand, if it exceeds 250 $\mu$m, there is a fear of the unstable surface state of the catalyst layers formed by drying and desolvation.

Here, the gas diffusion electrode materials are so-called electron conductive supports, and examples thereof include carbon paper and carbon cloth. In particular, the carbon paper is a porous material, and particularly has many pores (holes) because it is produced by the method of papermaking, so that it is preferred. Further, the solid polymer electrolytic membranes are solid polymer electrolytic membranes made of a perfluorocarbonsulfonic acid polymer, as described above, and have selective hydrogen ion exchange ability.

Then, in the third step of the present invention, the electrode paste layers applied and fixed onto the gas diffusion electrode materials and/or the solid polymer electrolytic membranes are heated and dried in an inert gas atmosphere to remove the organic solvents contained in the paste, thereby forming the catalyst layers comprising the platinum catalysts supported on the carbon and the ion conductive components on the gas diffusion electrode materials and/or the solid polymer electrolytic membranes.

In this case, as for the inert gas, nitrogen or argon can be preferably used. In removing process of the organic solvents, at first, alcohol components are removed at 50 to 80° C. at ordinary pressure, and then, organic solvents such as ethylene glycol can be removed by heating at the same temperature at reduced pressure.

The catalyst layers formed on the gas diffusion electrode materials and/or the solid polymer electrolytic membranes, which are obtained in the above-mentioned three steps, can be laminated on the gas diffusion electrode materials and/or the solid polymer electrolytic membranes by thermocompression bonding. The lamination can be suitably carried out at a temperature of 120 to 150° C. at a pressure of 20 to 200 kg/cm² by hot pressing. Under the conditions of a temperature of less than 120° C. and a pressure of less than 200 kg/cm², the lamination is insufficient. On the other hand, under the conditions of a temperature exceeding 150° C. and a pressure exceeding 200 kg/cm², there is a fear of decomposition of the ion conductive components. Although the pressing time varies depending on the temperature and pressure, it is usually preferably from 30 to 120 seconds. A hot pressing time of less than 30 seconds results in a fear of insufficient lamination, whereas exceeding 120 seconds results in a fear of decomposition of the ion conductive components, deterioration or deformation of the gas diffusion electrode materials and/or the solid polymer electrolytic membranes.

In the first stirring and mixing step and the second three-dimensional vibrating stirring step of the present invention, polytetrafluoroethylene resin solutions can be safely mixed, of course, as electrode constituting material components, in addition to the electrode catalysts and the ion conductive components.

The stirring and mixing apparatuses used in the first step of the present invention are not limited to planetary ball mills and sand mills, and any methods may be used as long as they are stirring methods having the effect of grinding the masses of the platinum-supporting carbon mainly in the aggregated state. As described above, homogenizers can also be suitably used. Further, the three-dimensional vibrating stirrers as for stirring apparatuses used in the second step of the present invention, are also not limited thereto, and any methods may be used as long as they are stirring methods in which the distance among the supporting carbon particles separated from one another in the first step is decreased to allow them to grow again.

Details of the processes and the functions and effects of the present invention are described below.

1. First Step

Grinding of Supporting Carbon and Coating of Fine Carbon Particles with Ion Conductive Component In the first step, the electrode paste is mixed which is composed of the electrode catalyst layer constituting material containing the electrode catalyst and the ion conductive component (alcohol solution), and the organic solvent. Specifically, aggregated masses of secondary aggregates of the supporting carbon, one of the materials constituting the electrode catalyst, are dispersed by use of a stirring mixer having a high grinding effect such as a planetary ball mill. In this case, the ion conductive component enters among the dispersed supporting carbon particles. That is to say, the ion conductive component is allowed to enter into pores of the supporting carbon.

In the above-mentioned grinding and mixing process, with respect to the particle size distribution of the supporting carbon, the median diameter is desirably on the submicron order. The above-mentioned grinding and mixing process is not limited to the stirring using the planetary ball mill, and any methods may be used as long as they are stirring methods having an effect of grinding the aggregated masses of the supporting carbon.

In the first step, a structure giving a conductive network to one another of the supporting carbon particles is broken, and there is a fear of impairment of the electron conductivity of the electrode after the preparation of the MEA. Further, in the above-mentioned step, it is far from easy to allow the ion conductive component to enter into pores of the supporting carbon. It is therefore necessary to change the structure broken to the highly entangled structure, and to allow the ion conductive component to enter into the pores of the supporting carbon, thereby enhancing the utilization ratio of the catalyst, in the following second step.

2. Second Step

Reconstruction of Structure by Three-Dimensional Vibrating Stirring Process and Filling of Ion Conductive Component in Pores of Supporting Carbon In the above first step, the supporting carbon ground in the highly dispersed carbon electrode paste as described above is broken even in its structure. Although surfaces of the supporting carbon particles are coated with the ion conductive component, it is difficult that the ion conductive component enters into the pores thereof. This paste is therefore stirred again with the three-dimensional vibrating mixer, thereby shortening the distance among the supporting carbon particles coated with the ion conductive component (increasing the viscosity of electrode paste). Therefore, the structure of the supporting carbon broken by grinding can be grown again. Moreover, there is no fear of impairment of the electron conductivity caused thereby in the electrode formed.

Further, in this step, the ion conductive component is allowed to enter the pores of the supporting carbon. This makes it possible to coat the catalyst supported on the carbon with the ion conductive component, so that the contact area increases, thereby being able to improve the utilization ratio of the catalyst.

3. Third Step

Coating of Catalyst Layer (Coating Gas Diffusion Electrode Material and/or Solid Polymer Electrolytic Membrane with the Above-Mentioned Highly Structured Electrode Paste, Followed by Removal of Solvent)

In the third step of the present invention, the electrode paste obtained in the above-mentioned first and second steps can be applied, surprisingly without addition of binders such as polytetrafluoroethylene resin solutions and/or thickners such as carboxymethyl cellulose, methyl cellulose, casein, polyvinyl alcohol, poly (ammonium acrylate) and starch.

Further, the above-mentioned electrode paste has a high viscosity of about 2,000 to about 20,000 cp (centipoises), and can be applied onto the gas diffusion electrode material (hereinafter also referred to as an "electron conductive support") and/or the solid polymer electrolytic membrane such as a perfluorocarbonsulfonic acid polymer membrane represented by "Nafion" to a desired thickness without flowing. When the above-mentioned electrode paste is applied to a porous material, there is no fear of entering of the electrode paste into the pores of the porous material to cause the blockage of the pores of the gas diffusion layer, thereby reducing the utilization ratio of the catalyst, because of its high viscosity. Accordingly, porous materials such as carbon paper can be suitably used as the electron conductive supports.

The electrode paste in which the supporting carbon is thus highly structured in the third step is applied onto the gas diffusion electrode material and/or the solid polymer electrolytic membrane. Then the alcohol or the solvent such as ethylene glycol used in the preparation of the electrode paste is dried in an atmosphere of an inert gas such as nitrogen or argon at ordinary pressure or reduced pressure to remove it.

According to the above-mentioned first to third steps, the gas diffusion electrode materials and/or the solid polymer electrolytic membranes are uniformly coated with the catalyst layers comprising the electrode catalysts and the ion conductive components, thereby being able to produce the electrodes for fuel cells of the present invention.

Figure 2:
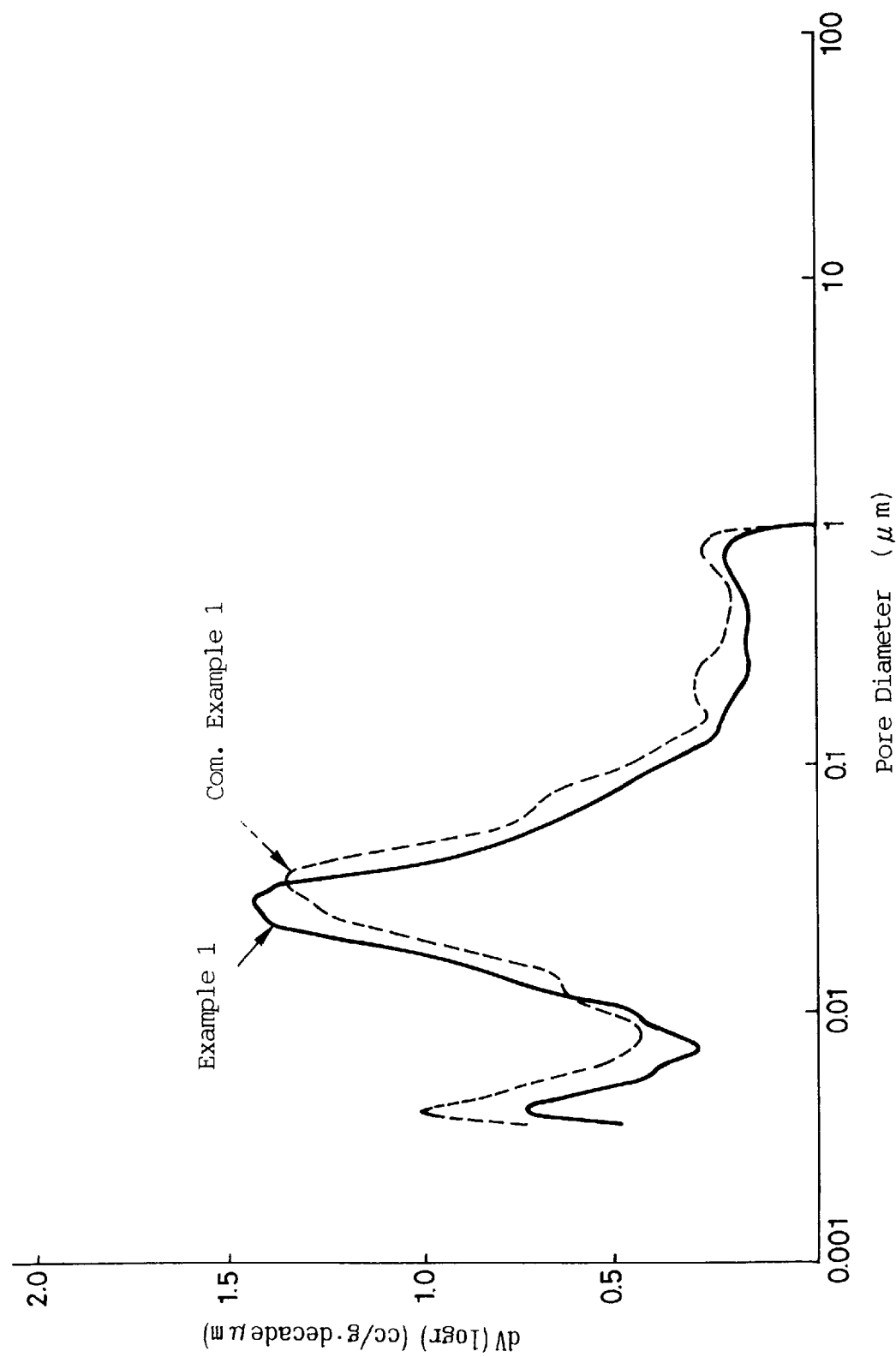
FIG. 2 is a graph showing the pore distribution of electrodes (MEAs) produced in Example 1 and Comparative Example 1 of the present invention.

Then, for clarifying the characteristics of the electrodes produced by the present invention, the pore distribution of an electrode (MEA) of the present invention and that of a prior-art electrode (MEA) are measured with a mercury porosimeter, and results thereof are shown in FIG. 2.

In FIG. 2, Example 1 shows the pore distribution of the electrode produced by the two-step stirring process (the first and second steps), and Comparative Example 1 shows that of the electrode produced by the conventional one-step stirring and mixing process.

As apparent from FIG. 2, the pore distribution of the electrode produced by the first and second steps of the present invention is decreased in the volume of pores having a smaller diameter, compared with that of the electrode produced only by the first step, so that it is said that the ion conductive component enters the minute pores of the supporting carbon, resulting in the decrease of the volume of the minute pores.

Figure 3:
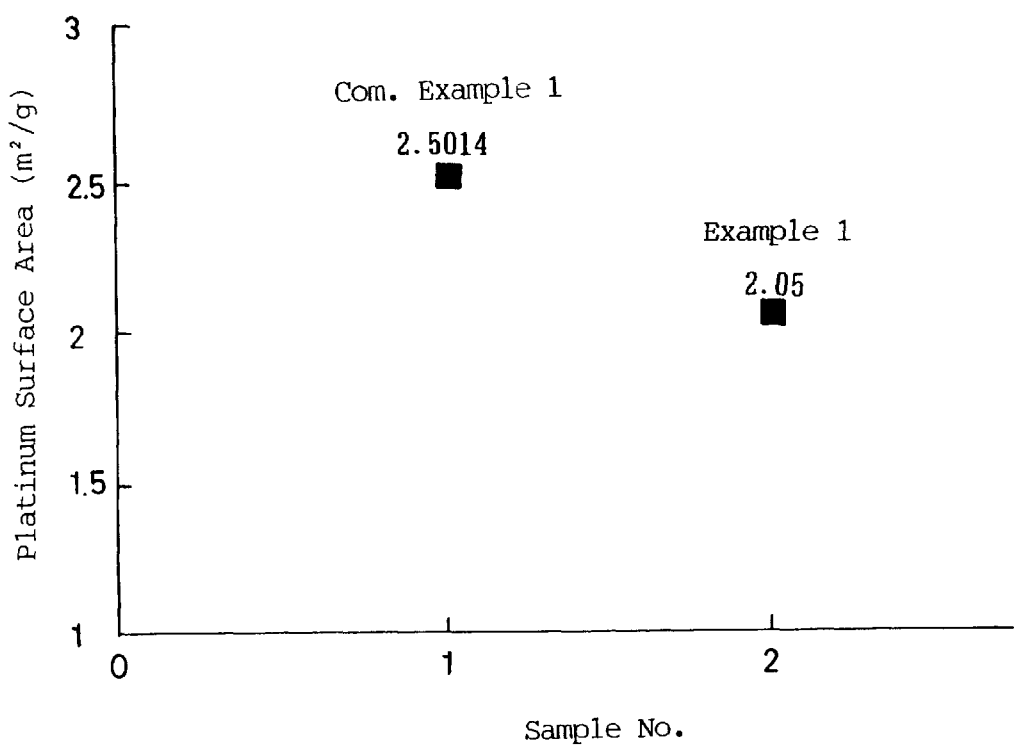
FIG. 3 is a graph showing the platinum surface area of (MEAs) produced in Example 1 and Comparative Example 1 of the present invention.

For the electrode of the present invention and the prior-art electrode, the specific surface area (the platinum surface area per unit mass) has been measured with a CO adsorption measuring apparatus, and results thereof are shown in FIG. 3.

In FIG. 3, Example 1 shows the platinum surface area not coated with the ion conductive material of the electrode produced by the two-step stirring process, and Comparative Example 1 shows that not coated with the ion conductive material of the electrode produced by the conventional one-step stirring and mixing process.

As apparent from FIG. 3, also in the CO adsorption measurement of the electrode produced by the first and second steps of the present invention, the CO adsorption is decreased as compared with the one-step process. It is therefore apparent that the coating of the electrode catalyst according to the ion conductive component is more improved than that of the conventional electrode. This indicates that the performance of the cell of the present invention is excellent than that of the conventional one.

According to the present invention, the electrode paste in which the supporting carbon is highly structured are obtained by subjecting the dispersion liquids containing the platinum-supporting carbon which is the electrode catalysts, the ion conductive components which are the solid polymer electrolytic membrane components, and the organic solvents to the two-step stirring. Further, according to the present invention, the supporting carbon in the electrode paste can be surely coated with the ion conductive components even inside the pores thereof. The fuel cells in which the MEAs comprised of the electrode paste of the present invention are integrated are improved in the performance of electric power generation.

The present invention will be illustrated with reference to an example and a comparative example below. Parts and percentages in the example and comparative example are on a weight basis, unless otherwise specified.

In the following Example 1, a planetary ball mill is used for stirring and mixing in the first step. However, it goes without saying that a homogenizer can be used in place of this.

EXAMPLE 1

As an alcohol solution of a solid polymer electrolyte (ion conductive component), a 5% solution of Nafion manufactured by Aldrich Chemical Co. Inc. was prepared. As carbon black, Ketjen black was used, and platinum was supported thereon at a concentration of 20% to prepare platinum-supporting carbon. The platinum-supporting carbon was added to the Nafion solution so that the amount of the solid polymer electrolyte (Nafion) is from 0.2 to 2.0% based on the amount of the platinum catalyst in the platinum-supporting carbon, thus preparing a catalyst dispersion liquid.

Thirty milliliters of the catalyst dispersion liquid of the Nafion solution and the platinum catalyst prepared in the previous step and 20 ml of ethylene glycol as an organic solvent, totaling 50 ml, were placed into a specialized container (a 150-ml Teflon (polytetrafluoroethylene manufactured by E. I. du Pont de Nemours and Company) container) of a planetary ball mill. Thirty Teflon balls each having a diameter of 10 mm were placed into the above-mentioned container, and stirring and mixing were carried out using the planetary ball mill at ordinary temperature for 180 minutes to obtain highly dispersed carbon electrode paste. The platinumsupporting carbon in the electrode paste obtained in this step had a particle size of about 0.005 to about 0.5 $\mu$m (see FIG. 1).

Then, the electrode paste obtained by grinding and mixing in the above-mentioned step was collected in another container, and stirred again with a three-dimensional vibrating stirrer at ordinary temperature at a rotational speed of 1,400 rpm for 120 minutes. In the above, the ball mill was used as a mixer having a grinding effect, but the mixer is not limited thereto. The use of a colloid mill or a blender mill also gave a similar effect.

The electrode paste obtained in the above-mentioned step was applied onto carbon paper (having a thickness of 400 $\mu$m), an electron conductive support, adjusting a thickness of the membrane at 50 $\mu$m (desolvated membrane) by screen printing. Then, the carbon paper coated with the electrode paste was dried in an atmosphere of argon gas at ordinary pressure at 80° C., and the solvent was removed under reduced pressure.

Electrodes constituted on the above-mentioned electron conductive support were hot pressed on both surfaces of a solid polymer electrolytic membrane "Nafion-115" manufactured by E. I. du Pont de Nemours and Company, at a temperature of 120 to 200° C. at a pressure of 20 to 100 kg/cm$^2$ for 60 seconds to obtain an MEA of the present invention.

Comparative Example 1

An MEA was obtained in the same manner as with Example 1 with the exception that the stirring was carried out by the stirring and mixing process of the first step (stirring with the planetary ball mill for 180 minutes).

With respect to the MEAS obtained in Example 1 and Comparative Example 1, the measurement of the pore distribution, the measurement of the CO adsorption and the I–V comparison test were made by the following methods.
Measurement of Pore Distribution Using a mercury porosimeter (trade name "Autoscan-60+ 500", manufactured by Quanta Chrome Co.), the pore distribution was measured by the mercury pressure process. Results of the measurement have already been shown in FIG. 2.

The results of FIG. 2 clearly indicate that most pores of the MEA of the present invention are distributed over sizes of 0.05 $\mu$m or less in the pore size distribution, and smaller than those of the prior-art MEA which are distributed over sizes of 0.07 $\mu$m or less.

Further, when the pore volume in the vicinity of a pore size of 0.008 μm of the MEA of this invention is compared with that in the vicinity of a pore size of 0.009 μm of the prior-art MEA, the MEA of this invention is smaller in pore size, and the pore volume is decreased. As described above, the MEA of this invention is decreased in the volume of pores smaller than those of the prior-art MEA in the pore distribution. This evidently shows that the ion conductive component enters into the minute pores of the supporting carbon.

Measurement of CO Adsorption

A CO adsorption apparatus, "ASAP2010" (trade name), manufactured by Shimazu Corp. was used.

Prior to measurement, a sample piece (5 cm×10 cm) of an electrode (MEA) was deaerated under the circumstances of high temperature and vacuum (temperature: 100° C., degree of vacuum: $10^{-5}$ Torr) for 480 minutes, and then, hydrogen was introduced to remove impurities on a surface of the electrode, followed by measurement of CO adsorption at 35° C. Results of the measurement are shown in FIG. 3.

As apparent from FIG. 3, the platinum surface area of the MEA of this invention is 2.05 $m^2/g$, and that of the prior-art MEA is 2.50 $m^2/g$. Accordingly, the MEA of this invention is larger in the ratio of the electrode catalyst coated with the ion conductive component than the prior-art MEA. It is therefore said that the electrode of this invention is higher in performance.

I–V Comparison Test

As to the cell operating conditions, hydrogen was used as a fuel, and this was supplied to the anode side. On the other hand, oxygen was supplied to the cathode side. The supply pressure of both gases was 100 Kpa on both of the hydrogen and oxygen sides. A cell was operated, setting the dew point of hydrogen as 80° C., that of oxygen as 50° C., and keeping the temperature of the cell at 85° C.

The utilization ratio of the gases was constant at 67% on the anode side and at 50% on the cathode side. Results of the measurement of the current density (I) and the cell voltage (V) are shown in FIG. 4.

Figure 4:
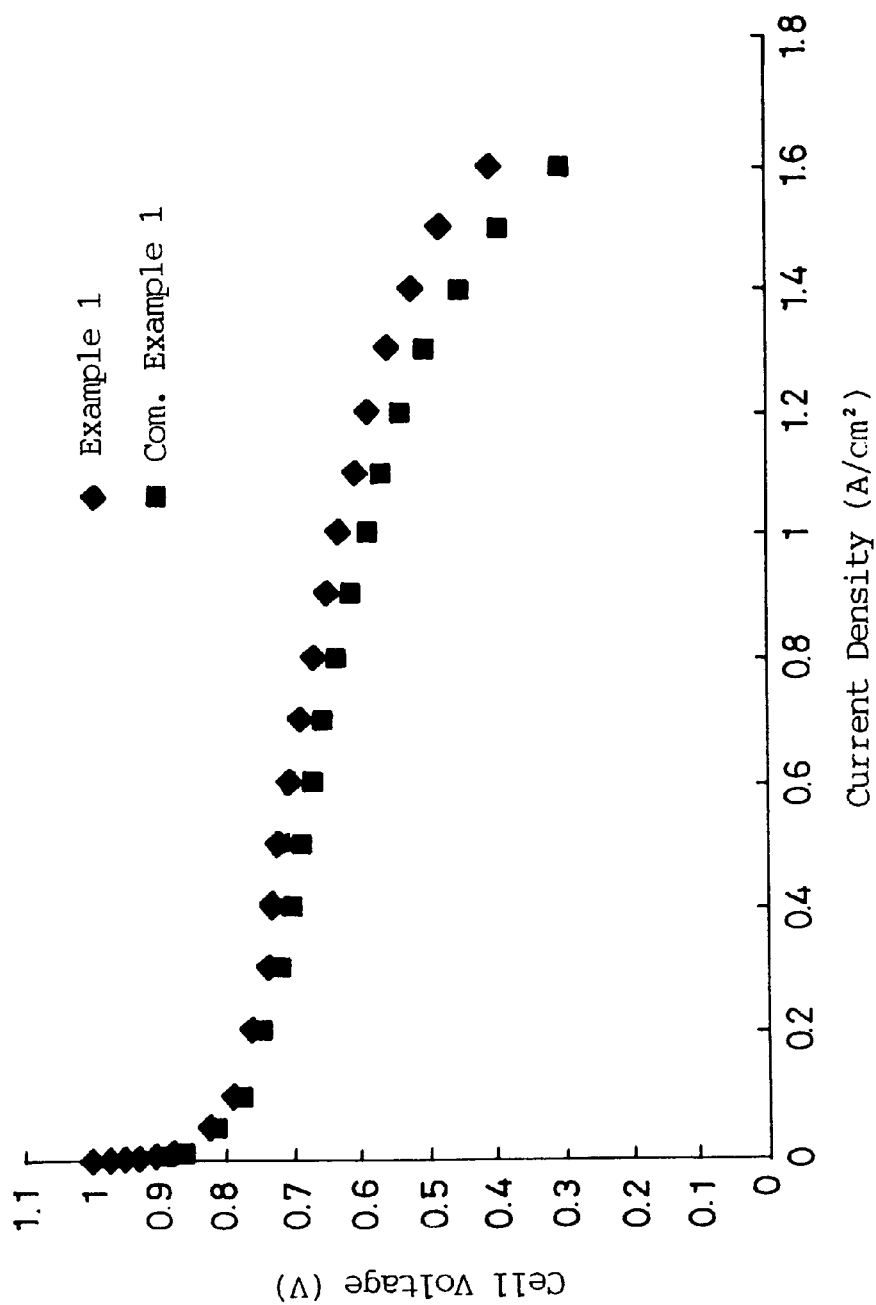
FIG. 4 is a graph showing the relationship between the current density and the cell voltage measured for respective cells under test into which MEAs produced in Example 1 and Comparative Example 1 of the present invention are each integrated.

In FIG. 4, Example 1 shows the cell voltage of the test cell into which the MEA produced by the two-step stirring process of the present invention is integrated, and Comparative Example 1 shows the cell voltage of the test cell into which the MEA produced by the conventional one-step stirring and mixing process is integrated.

As apparent from FIG. 4, the cell voltage correlates with the current density, and the cell voltage relatively decreases with an increase in the current density. Further, the high cell voltage means the high utilization ratio of the catalyst. In FIG. 4, the test cell of Example 1 according to the present invention shows the high cell voltage in all regions in which the current density is 1.6 $A/cm^2$ or less, compared with the test cell of Comparative Example 1. This reveals that the electrode characteristics are excellent, and that the high utilization ratio of the catalyst is obtained.

What is claimed is:

1. An electrode for a fuel cell comprising a catalyst layer obtained by a first step of homogeneously mixing carbon supporting platinum which is an electrode catalyst, an alcohol solution of an ion conductive component which is a solid polymer electrolytic membrane component, and an organic solvent by means of a stirrer having a grinding effect to produce electrode paste in which the carbon is highly dispersed; a second step of stirring said electrode paste by means of a three-dimensional vibrating stirrer in order to obtain highly structured carbon on which platinum is supported; and a third step of coating a gas diffusion electrode material and/or a solid polymer electrolytic membrane with said electrode paste in which said carbon is highly structured, followed by removal of the organic solvent.

2. The electrode according to claim 1, wherein said stirrer having a grinding effect is a planetary ball mill or a homogenizer.

3. The electrode according to claim 1 or 2, wherein said third step comprises coating the gas diffusion electrode material with the electrode paste in which the carbon is highly structured, followed by removal of the organic solvent.

4. The electrode according to claim 3, wherein said gas diffusion electrode material is carbon paper.

5. The electrode according to claim 3, wherein said catalyst layer is laminated on the solid polymer electrolytic membrane to constitute a membrane electrode assembly.

6. The electrode according to claim 2, wherein said gas diffusion electrode material is carbon paper.

7. The electrode according to claim 2, wherein said catalyst layer is laminated on the solid polymer electrolytic membrane to constitute a membrane electrode assembly.

8. The electrode according to claim 1, wherein said gas diffusion electrode material is carbon paper.

9. The electrode according to claim 4, wherein said catalyst layer is laminated on the solid polymer electrolytic membrane to constitute a membrane electrode assembly.

10. The electrode according to claim 1, wherein said catalyst layer is laminated on the solid polymer electrolytic membrane to constitute a membrane electrode assembly.

* * * * *